(12) United States Patent
He et al.

(10) Patent No.: US 10,884,567 B2
(45) Date of Patent: Jan. 5, 2021

(54) CIRCUIT AND METHOD FOR DRIVING TOUCH SUBSTRATE, TOUCH DEVICE AND OPERATING METHOD OF THE SAME

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Min He, Beijing (CN); Xiaodong Xie, Beijing (CN); Jing Wang, Beijing (CN); Jiang Zhu, Beijing (CN); Zhen Qiu, Beijing (CN); Yuan Li, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/512,978

(22) Filed: Jul. 16, 2019

(65) Prior Publication Data
US 2020/0104013 A1    Apr. 2, 2020

(30) Foreign Application Priority Data
Sep. 28, 2018   (CN) .......................... 2018 1 1141534

(51) Int. Cl.
*G06F 3/044* (2006.01)

(52) U.S. Cl.
CPC .......... *G06F 3/0446* (2019.05); *G06F 3/0443* (2019.05); *G06F 3/0447* (2019.05)

(58) Field of Classification Search
CPC ..... G06F 3/0447; G06F 3/0446; G06F 3/0443
See application file for complete search history.

(56) References Cited

U.S. PATENT DOCUMENTS

| 2015/0077389 A1* | 3/2015 | Ding ........................ G06F 3/044 345/174 |
| 2017/0249047 A1* | 8/2017 | Shin ........................ G06F 3/0416 |

* cited by examiner

*Primary Examiner* — Charles V Hicks
(74) *Attorney, Agent, or Firm* — Brooks Kushman P.C.

(57) ABSTRACT

A circuit and a method for driving a touch substrate, a touch device and a method for operating the touch device are provided. The method for driving the touch substrate includes inputting first driving signals to respective ones of the plurality of touch electrodes sequentially in a first time duration within a touch period; and inputting second driving signals to respective ones of the plurality of touch electrodes in a second time duration within the touch period, wherein signal strengths of the second driving signals are larger than signal strengths of the first driving signals.

15 Claims, 4 Drawing Sheets

In a first time duration within a touch period, inputting first driving signals to the respective ones of the plurality of touch electrodes sequentially, and determining a position of a contact touch operation based on sensing signals generated on sensing electrodes in the mutual-capacitive type touch substrate, and based on the first driving signals inputted to the plurality of touch electrodes — S201

In a second time duration within the touch period, inputting second driving signals to the respective ones of plurality of touch electrodes, and determining a position and a type of a floating touch operation based on sensing signals generated on the sensing electrodes, and based on the second driving signals inputted to the plurality of touch electrodes, wherein signal strengths of the second driving signals are larger than signal strengths of the first driving signals — S202

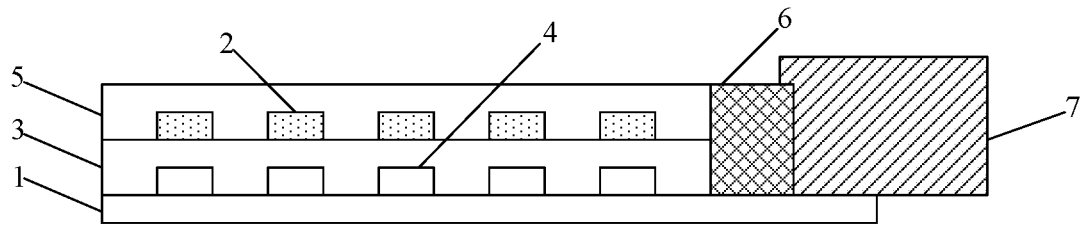

FIG. 5

| In a first time duration within a touch period, inputting first driving signals to the respective ones of the plurality of touch electrodes sequentially, and determining a position of a contact touch operation based on sensing signals generated on sensing electrodes in the mutual-capacitive type touch substrate, and based on the first driving signals inputted to the plurality of touch electrodes | S201 |

| In a second time duration within the touch period, inputting second driving signals to the respective ones of plurality of touch electrodes, and determining a position and a type of a floating touch operation based on sensing signals generated on the sensing electrodes, and based on the second driving signals inputted to the plurality of touch electrodes, wherein signal strengths of the second driving signals are larger than signal strengths of the first driving signals | S202 |

FIG. 6

CIRCUIT AND METHOD FOR DRIVING TOUCH SUBSTRATE, TOUCH DEVICE AND OPERATING METHOD OF THE SAME

CROSS-REFERENCE TO RELATED APPLICATION

This application claims priority to Chinese Patent Application No. 201811141534.0 filed on Sep. 28, 2018, which is incorporated herein by reference in its entirety.

TECHNICAL FIELD

The present disclosure relates to the field of touch technology, and in particular, relates to a circuit and a method for driving a touch substrate, a touch device and a method for operating the touch device.

BACKGROUND

A floating touch technique may not only realize a touch function when a finger touches a screen, but also realize the touch function in a case that a preset distance exists between the finger and the screen.

SUMMARY

In a first aspect, a method for driving a touch substrate is provided in the present disclosure, wherein the touch substrate includes a plurality of touch electrodes, the method includes: inputting first driving signals to respective ones of the plurality of touch electrodes sequentially in a first time duration within a touch period; and inputting second driving signals to respective ones of the plurality of touch electrodes in a second time duration within the touch period, wherein signal strengths of the second driving signals are larger than signal strengths of the first driving signals.

Optionally, the signal strengths of the second driving signals are twice or more than twice of the signal strengths of the first driving signals.

Optionally, prior to the inputting the second driving signals to the respective ones of the plurality of touch electrodes, the method further includes dividing the plurality of touch electrodes into multiple groups of touch electrodes, wherein each group of the multiple groups of touch electrodes includes at least one touch electrode of the plurality of touch electrodes; and the inputting the second driving signals to the respective ones of the plurality of touch electrodes includes inputting the second driving signals to the multiple groups of touch electrodes sequentially, wherein the second driving signals inputted to each group of the multiple groups of touch electrodes are inputted to the at least one touch electrode in the each group of the multiple groups of touch electrodes simultaneously.

Optionally, the at least one touch electrode includes at least three neighboring touch electrodes.

In a second aspect, a circuit for driving a touch substrate is provided in the present disclosure. The touch substrate includes a plurality of touch electrodes, the circuit for driving the touch substrate is electrically connected to the plurality of touch electrodes and includes: a first driving sub-circuit, configured to input first driving signals to respective ones of the plurality of touch electrodes sequentially in a first time duration within a touch period; and a second driving sub-circuit, configured to input second driving signals to respective ones of the plurality of touch electrodes in a second time duration within the touch period, wherein signal strengths of the second driving signals are larger than signal strengths of the first driving signals.

Optionally, the signal strengths of the second driving signals are twice or more than twice of the signal strengths of the first driving signals.

Optionally, the plurality of touch electrodes includes multiple groups of touch electrodes, each group of the multiple groups of touch electrodes includes at least one touch electrode of the plurality of touch electrodes, and the second driving sub-circuit is further configured to input the second driving signals to the multiple groups of touch electrodes sequentially, wherein the second driving signals inputted to each group of the multiple groups of touch electrodes are inputted to the at least one touch electrode in the each group of the multiple groups of touch electrodes simultaneously.

In a third aspect, a touch device is provided in the present disclosure. The touch device includes a touch substrate, including a plurality of touch electrodes; and the circuit according to the second aspect, electrically connected to the plurality of touch electrodes.

Optionally, in a case that the plurality of touch electrodes include multiple groups of touch electrodes, each group of the multiple groups of touch electrodes includes at least three neighboring touch electrodes.

Optionally, the touch substrate is a mutual-capacitive type touch substrate, and the plurality of touch electrodes are used as driving electrodes in the mutual-capacitive type touch substrate; or the touch substrate is a self-capacitive type touch substrate, and the plurality of touch electrodes are used as self-capacitive touch electrodes in the self-capacitive type touch substrate.

Optionally, the touch substrate is the mutual-capacitive type touch substrate, and the plurality of touch electrodes are M touch electrodes. The touch substrate further includes: M×N sensing electrodes, wherein M and N are positive integers; and an insulating layer located between the M touch electrodes and the M×N sensing electrodes.

Optionally, the M×N sensing electrodes are arranged in a form of a matrix having M rows and N columns; each row of the M rows includes N sensing electrodes, and orthographic projections of the N sensing electrodes on the touch substrate are within orthogonal projections of the M touch electrodes on the touch substrate.

Optionally, the touch substrate is the self-capacitive type touch substrate, the touch substrate further includes a common electrode and an insulating layer located between the plurality of touch electrodes and the common electrode.

In a fourth aspect, a method for operating a touch device is provided in the present disclosure. The method is applied to the touch device according to the third aspect, and in a case that the touch substrate included in the touch device is the mutual-capacitive type touch substrate, the method includes in a first time duration within a touch period, inputting first driving signals to respective ones of the plurality of touch electrodes sequentially, and determining a position of a contact touch operation based on sensing signals generated on sensing electrodes in the mutual-capacitive type touch substrate, and based on the first driving signals inputted to the plurality of touch electrodes; and in a second time duration within the touch period, inputting second driving signals to the respective ones of plurality of touch electrodes, and determining a position and a type of a floating touch operation based on sensing signals generated on the sensing electrodes, and based on the second driving signals inputted to the plurality of touch electrodes, wherein signal strengths of the second driving signals are larger than signal strengths of the first driving signals.

Optionally, the determining the type of the floating touch operation includes: determining the type of the floating touch operation based on an order of time points at which sensing signals generated on the sensing electrodes are changed.

In a fifth aspect, a method for operating a touch device is provided in the present disclosure. The method is applied to the touch device according to the third aspect, and in a case that the touch substrate in the touch device is the self-capacitive type touch substrate, the method includes: in a first time duration within a touch period, inputting first driving signals to the respective ones of the plurality of touch electrodes sequentially, and determining a position of a contact touch operation based on electric fields generated between the plurality of touch electrodes and a common electrode in the self-capacitive type touch substrate, and based on the first driving signals inputted to the plurality of touch electrodes; and in a second time duration within the touch period, inputting second driving signals to the respective ones of plurality of touch electrodes, and determining a position and a type of a floating touch operation based on electric fields generated between the plurality of touch electrodes and the common electrode, and based on the second driving signals inputted to the plurality of touch electrodes, wherein signal strengths of the second driving signals are larger than signal strengths of the first driving signals.

Optionally, the determining the type of the floating touch operation includes: determining the type of the floating touch operation based on an order of time points at which the electric fields generated between the plurality of touch electrodes and the common electrode are changed.

BRIEF DESCRIPTION OF THE DRAWINGS

Drawings described herein are used to provide a further understanding of the present disclosure, and constitute a part of the present disclosure. Illustrative embodiments of the present disclosure and a description thereof are used to explain the present disclosure, and do not form undue limitations of the present disclosure. In the drawing:

FIG. 5 is a schematic cross-sectional view of a touch substrate provided in some embodiments of the present disclosure;

FIG. 6 is a first flowchart of a method for operating a touch device provided in some embodiments of the present disclosure.

DETAILED DESCRIPTION

To further explain a circuit for driving a touch substrate and a method for driving the touch substrate, a touch device and a method for operating the touch device provided in some embodiments of the present disclosure, the following detailed description will be made with reference to accompanying drawings.

In order to meet people's needs, more and more electronic products need to support touch functions. A capacitive touch structure has stable performance and a long service life. With continuous development of a touch technology, it is a future trend of the touch technology to combine a contact touch technique and a floating touch technique. However, all solutions in related art in which the contact touch technique and the floating touch technique are combined together require an addition system specifically used to implement the floating touch technique, resulting in a complicated structure and a high production cost of this touch-type electronic product. The inventors of the present disclosure have found that when applying a capacitive touch structure to implementation of the floating touch technique, a technical hurdle to be overcome is that a field strength of an electric field formed on the touch screen is not strong enough to sense a change in capacitance caused due to an occurrence of a floating touch. Therefore, if the strength of the electric field on the touch screen may be increased so that a certain height above the touch screen is covered, the contact touch technique and the floating touch technique may be combined together.

An object of the present disclosure is to provide a circuit for driving a touch substrate, a method for driving the touch substrate, a touch device, and a method for operating the touch device, so as to solve a problem in the relevant art that the touch-type electronic product formed based on the floating touch technique has a complicated structure and a high production cost.

Figure 1:
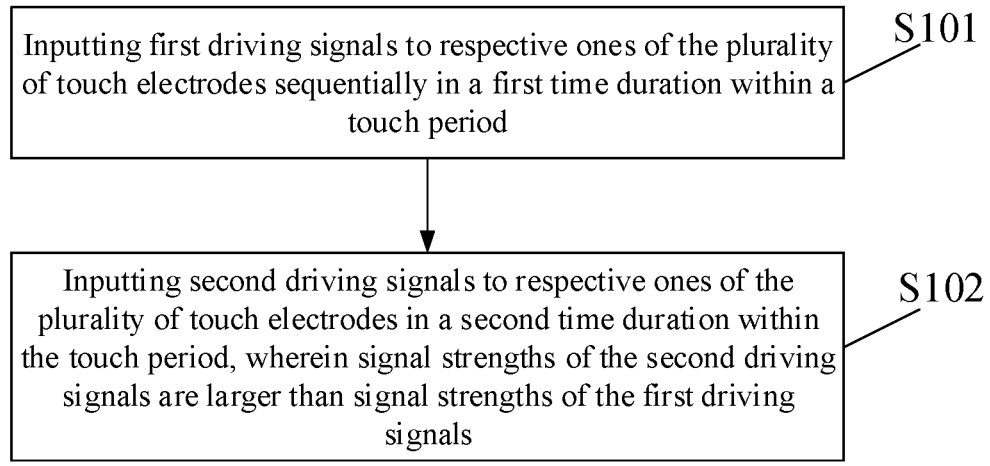
FIG. 1 is a flowchart of a method for driving a touch substrate provided in some embodiments of the present disclosure.

As shown in FIG. 1, some embodiments of the present disclosure provide a method for driving a touch substrate. The touch substrate includes a plurality of touch electrodes, and the method includes following steps S101-S102.

Step S101: inputting first driving signals to respective ones of a plurality of touch electrodes sequentially in a first time duration within a touch period.

Step S102: inputting second driving signals to respective ones of the plurality touch electrodes in a second time duration within the touch period, wherein signal strengths of the second driving signals are larger than signal strengths of the first driving signals.

Specifically, in a case that the touch substrate is a mutual-capacitive type touch substrate, the mutual-capacitive type touch substrate further includes a plurality of sensing electrodes. When the touch substrate is driven by the driving method as described above, in the step S101, in a first time duration within each touch period, the first driving signals are inputted to the respective touch electrodes included in the touch substrate sequentially, and the plurality of sensing electrodes included in the touch substrate receive the first driving signals, so that first electric fields are generated between the touch electrodes and the sensing electrodes. In this case, if a contact touch operation occurs, a sensing signal generated by a sensing electrode of the sensing electrodes at a contact touch position corresponding to a position of the contact touch operation is changed, and an exact touch position of the contact touch operation is thus determined based on the changed sensing signal and the first driving signals inputted to the touch electrodes.

In step S102, in the second time duration within each touch period, the second driving signals are inputted to the respective touch electrodes and the second driving signals are provided to have signal strengths larger than those of the first driving signals, so that second electric fields are generated between the touch electrodes and the sensing electrodes. The second electric fields are superposed on the first electric fields generated between the touch electrodes and the sensing electrodes in the first time duration and electric fields with larger strengths and wider coverage ranges are formed on the touch substrate. In a case that a floating touch operation occurs, the sensing signal generated by the sensing electrode at a floating touch position corresponding to a position of the floating touch operation is changed, and an exact position and a type of the floating touch operation are thus determined based on the changed sensing signal and the second driving signal inputted to the touch electrode corresponding to the sensing electrode.

It should be noted that the touch substrate includes a plurality of touch periods, each of the touch periods includes a first time duration and a second time duration. In the first time duration, the contact touch operation may be implemented to the touch substrate, and in the second time duration, and the floating touch operation may be implemented to the touch substrate.

As may be seen from specific processes of driving the touch substrate to operate, if the method for driving the touch substrate provided in some embodiments of the present disclosure is used to drive the touch substrate, it is possible to input the first driving signals to the respective touch electrodes in the touch substrate sequentially in the first time duration within each touch period, and then input the second driving signals to the respective touch electrodes in the touch substrate, wherein the second driving signals have signal strengths larger than those of the first driving signals, so that the contact touch operation may be implemented to the touch substrate in the first time duration and the floating touch operation may be implemented to the touch substrate in the second time duration. Thus, when the method driving a touch substrate provided in some embodiments of the present disclosure is used to drive the touch substrate, there is no need to add an additional system in the touch substrate for a purpose of implementing the floating touch operation, the floating touch operation may be realized only by further applying, to the touch substrate capable of implementing the contact touch operation, driving signals to increase the strengths of electric fields generated on the touch substrate.

Therefore, when the method for driving the touch substrate provided in some embodiments of the present disclosure is used to drive the touch substrate, the contact touch technique and the floating touch technique may be combined without adding production costs of the touch substrate, so as to solve effectively the problem in the related art that the touch-type electronic products based on the floating touch technique have complicated structures and high production costs, without increasing the production cost of the touch substrate.

In some embodiments, the signal strengths of the second driving signals may be twice or more than twice of the signal strengths of the first driving signals.

Specifically, the larger the signal strengths of the signals applied to the touch electrodes are, the larger the strengths of the electric fields generated on the touch substrate are. Therefore, in order to generate electric fields having sufficiently large electric-field strengths on the touch substrate in the second time duration, the signal strengths of the second driving signals may be set to be twice or more than twice of the signal strengths of the first driving signals. In more details, taking a mutual-capacitive type touch substrate as an example, when the signal strengths of the second driving signals are set to be twice or more than twice of the signal strengths of the first driving signals, second electric fields generated between the touch electrodes and the sensing electrodes under action of the second driving signals have larger electric-field strengths, and thus after the second electric fields are superposed on the first electric fields, the electric-field strengths are large enough to cover a certain range above the touch substrate, thereby allowing for better implementation of the floating touch operation.

Further, the plurality of touch electrodes may be divided into multiple groups of touch electrodes, each group of the multiple groups includes at least one touch electrode. The inputting the second driving signals to the respective touch electrodes includes: inputting the second driving signals to the multiple groups of touch electrodes sequentially, wherein the second driving signals inputted to each group of the multiple groups are inputted to the at least one touch electrode in the each group simultaneously.

Specifically, when the second driving signals are inputted to the plurality of touch electrodes, the plurality of touch electrodes included in the touch substrate may be firstly divided into multiple groups of touch electrodes, each group of the multiple groups of touch electrodes includes at least one touch electrode. Then, the second driving signals are inputted to the respective multiple groups of touch electrodes sequentially, and when the second driving signals are inputted to each group of the multiple groups of touch electrodes, the second driving signals are inputted to the respective touch electrodes included in the each group of the multiple groups simultaneously. In this way, when a group of touch electrodes includes a plurality of touch electrodes, strengths of electric fields generated by the plurality of touch electrodes in the group are superposed to further increase the strengths of the electric fields generated on the touch substrate in the second time duration, thereby allowing for better implementation of the floating touch operation.

It should be noted that when the second driving signals are inputted to the touch electrodes in the above-described way, the determined position of the floating touch operation may satisfy accuracy requirements for determining an actual position of the floating touch operation.

It should be noted that when the plurality of touch electrodes are divided into the multiple groups of touch electrodes, a quantity of the touch electrodes included in each of the multiple groups may be set according to actual requirements, and the larger the quantity of the touch electrodes in each group of touch electrodes is, the larger the strengths of electric fields generated by the touch electrodes in this group is. However, since the second driving signals are inputted to the respective touch electrodes included in a same group of touch electrodes simultaneously, when there are too many touch electrodes in each group of touch electrodes, it is not conducive to determination of the position of the floating touch operation. Optionally, each group of touch electrodes may include at least three neighboring touch electrodes. Optionally, each group of touch electrodes may include three neighboring touch electrodes, so that it is possible to increase the electric-field strengths generated on the touch substrate, so as to meet a requirement for the electric fields by the floating touch operation, and it may also be possible to more accurately determine the position and the type of the floating touch operation.

Figure 2:
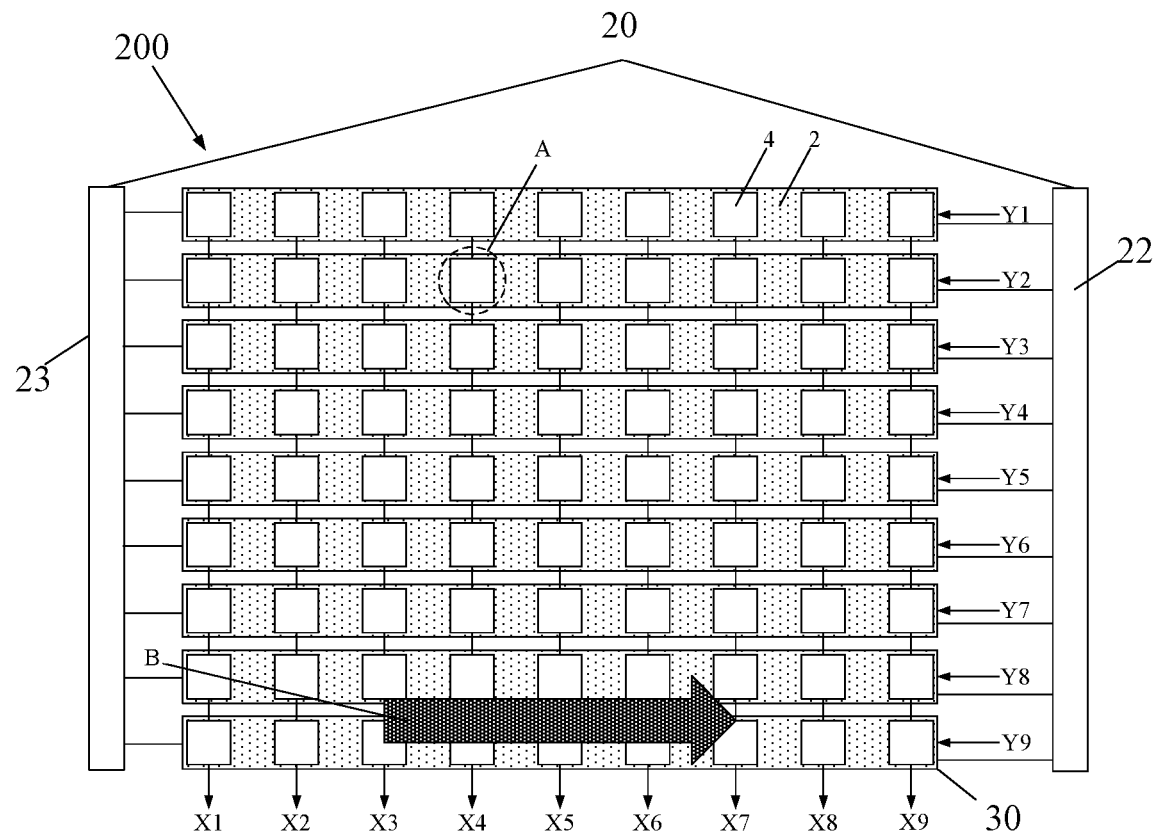
FIG. 2 is a schematic diagram showing a structure of a circuit for driving a touch substrate provided in some embodiments of the present disclosure.

Some embodiments of the present disclosure further provide a circuit 20 for driving a touch substrate. Referring for FIG. 2, FIG. 2 is a schematic diagram showing the circuit for driving the touch substrate provided by the present disclosure, the driving circuit is configured to implement the driving method provided in the above embodiments. The touch substrate includes a plurality of touch electrodes, and the driving circuit 20 includes a first driving sub-circuit 22 and a second driving sub-circuit 23. The first driving sub-circuit 22 is configured to input first driving signals to respective touch electrodes sequentially in a first time duration within a touch period; and a second driving sub-circuit 23 is configured to input second driving signals to the respective touch electrodes in a second time duration within the touch period, wherein the second driving signals have signal strengths larger than those of the first driving signals.

Specifically, in a case that the touch substrate is a mutual-capacitive type touch substrate, the mutual-capacitive type touch substrate 30 further includes a plurality of sensing electrodes. Referring to FIG. 2, FIG. 2 shows a structure of a mutual-capacitive type touch substrate, the mutual-capacitive type touch substrate 30 includes nine touch electrodes Y1 to Y9 arranged in a first direction and nine sensing electrodes X1 to X9 arranged in a second direction. When the mutual-capacitive type touch substrate shown in FIG. 2 is driven by the driving circuit provided in some embodiments of the present disclosure, the first driving sub-circuit 22 is connected to the plurality of touch electrodes Y1 to Y9, and configured to input first driving signals to the respective touch electrodes Y1 to Y9 included in the touch substrate 30 sequentially in a first time duration within each touch period; the plurality of sensing electrodes X1 to X9 included in the touch substrate 30 receive the first driving signals, so that the first electric fields are generated between the touch electrodes Y1 to Y9 and the sensing electrodes X1 to X9. If the contact touch operation occurs, a sensing signal generated by a sensing electrode at a contact touch position corresponding to a position of the contact touch operation is changed, and the position of the contact touch operation is thus determined based on the changed sensing signal and the first driving signal inputted to the touch electrode corresponding to the sensing electrode. The second driving sub-circuit 23 is connected to the plurality of touch electrodes Y1 to Y9, and configured to input second driving signals to the respective touch electrodes in the second time duration within the touch period, wherein the second driving signals are provided to have signal strengths larger than those of the first driving signals, so that second electric fields are generated between the touch electrodes and the sensing electrodes. Thus, the second electric fields are superposed on the first electric fields generated between the touch electrodes and the sensing electrodes in the first time duration, so as to form electric fields with larger electric-field strengths and wider coverage ranges on the touch substrate 30. In a case that a floating touch operation occurs, sensing signals generated by the sensing electrodes at the floating touch positions corresponding to positions of the floating touch operation are changed, and positions and a type of the floating touch operation are thus determined based on the changed sensing signals and the second driving signals inputted to the touch electrodes corresponding to the sensing electrodes.

As may be seen from specific process of driving the touch substrate to operate, if the circuit for driving the touch substrate provided in some embodiments of the present disclosure is used to drive the touch substrate, the first driving signals may be inputted to the respective touch electrodes in the touch substrate sequentially in the first time duration within each touch period, and then the second driving signals having signal strengths larger than those of the first driving signals may be inputted to the respective touch electrodes in the touch substrate, so that a contact touch operation on the touch substrate may be implemented in the first time duration and a floating touch operation above the touch substrate may be implemented in the second time duration. Thus, when the driving circuit provided in some embodiments of the present disclosure is used to drive the touch substrate, there is no need to add an additional system in the touch substrate for a purpose of implementing the floating touch operation, and the floating touch operation may be realized simply by further applying driving signals to the touch substrate in the relevant art capable of implementing the contact touch operation, so as to increase the strengths of the electric fields generated on the touch substrate.

Therefore, when the circuit for driving the touch substrate provided in some embodiments of the present disclosure is used to drive the touch substrate, the contact touch technique and the floating touch technique may be combined to solve the problem in the related art that the touch-type electronic products based on the floating touch technique have complicated structures and high production costs, without increasing a production cost of the touch substrate.

Further, the signal strengths of the second driving signals inputted to the respective touch electrodes by the second driving sub-circuit may be twice or more than twice of the signal strengths of the first driving signals.

Specifically, taking the mutual-capacitive type touch substrate as an example, when the signal strengths of the second driving signals are set to be twice or more than twice of the signal strengths of the first driving signals, the second electric fields generated between the touch electrodes and the sensing electrodes under the action of the second driving signals have larger electric field strengths. After the second electric fields are superposed with the first electric fields, the resulting electric field strengths are large enough to cover a certain range above the touch substrate, thereby allowing for better implementation of the floating touch operation.

Further, the plurality of touch electrodes may be divided into multiple groups of touch electrodes, each of the multiple groups includes at least one touch electrode. The second driving sub-circuit is further configured to input the second driving signals to the plurality groups of touch electrodes sequentially, wherein second driving signals are inputted to at least one touch electrode in each group of the multiple groups simultaneously.

Specifically, when the second driving signals are inputted to the respective touch electrodes by the second driving sub-circuit, the plurality of touch electrodes included in the touch substrate may be firstly divided into multiple groups of touch electrodes, each group of the multiple groups includes at least one touch electrode. Then, the second driving signals are inputted to respective groups of touch electrodes sequentially, and when second driving signals are inputted to each group of the multiple groups of touch electrodes, the second driving signals are inputted to the at least one touch electrode included in the group of touch electrodes simultaneously. In this way, when the group of touch electrodes includes a plurality of touch electrodes, electric-field strengths of electric fields generated by the plurality of touch electrodes in a same group are superposed to further increase the strengths of the electric fields generated above the touch substrate in the second time duration, thereby allowing for better implementation of the floating touch operation.

Some embodiments of the present disclosure further provide a touch device 200. The touch device includes a touch substrate 30 and the driving circuit 20 provided by the above embodiments, wherein the touch substrate 30 includes a plurality of touch electrodes.

In particular, when the circuit for driving the touch substrate provided in the above embodiments is used to drive the touch substrate, the contact touch technique and the floating touch technique may be combined to solve the problem in the related art that the touch-type electronic products based on the floating touch technique have complicated structures and high production costs, without increasing a production cost of the touch substrate. Therefore, when the touch device provided in some embodiments of the present disclosure includes the touch substrate and the driving circuit as described above, the above-mentioned technical effects may also be achieved by the touch device, and details of the touch device will not be repeated herein.

Further, when the plurality of touch electrodes are divided into multiple groups of touch electrodes, each group of the multiple groups may include at least three neighboring touch electrodes. Optionally, each group of touch electrodes may include three neighboring touch electrodes, so that not only the electric field strengths generated on the touch substrate may be increased and requirements for the electric fields by the floating touch operation may be satisfied, and but also the position and the type of the floating touch operation may be determined more accurately.

Further, the touch substrate may be a mutual-capacitive type touch substrate or a self-capacitive type touch substrate. When the touch substrate is the mutual-capacitive type touch substrate, the touch electrodes serve as driving electrodes in the mutual-capacitive type touch substrate. The touch substrate also includes a plurality of sensing electrodes. In some embodiments, the plurality of touch electrodes are arranged in a plurality of rows and each of the touch electrodes is arranged in a first direction; and the plurality of sensing electrodes are arranged in a plurality of columns and each of the sensing electrodes is arranged in a second direction that intersects the first direction. Optionally, the first direction is perpendicular to the second direction. The touch electrodes and the sensing electrodes are arranged in different layers, and an insulating layer is arranged between the touch electrodes and the sensing electrodes.

Specifically, when the mutual-capacitive type touch substrate is used to implement the touch operation, the first driving signals are inputted sequentially to the respective touch electrodes included in the touch substrate in the first time duration within each touch period, and the plurality of sensing electrodes included in the touch substrate receives the first driving signals, so that first electric fields are generated between the touch electrodes and the sensing electrodes. If the contact touch operation occurs, a sensing signal generated by the sensing electrode at a contact touch position corresponding to a position of the contact touch operation is changed, and the position at which the contact touch operation occurs is thus determined based on the changed sensing signal and the first driving signal inputted to the touch electrode corresponding to the sensing electrode. In the second time duration within each touch period, the second driving signals are inputted to the respective touch electrodes, and the second driving signals are provided to have signal strengths larger than those of the first driving signals, so that the second electric fields are generated between the touch electrodes and the sensing electrodes. Thus, the second electric fields are superposed with the first electric fields generated between the touch electrodes and the sensing electrodes in the first time duration, so as to form electric fields having larger strengths and wider coverage ranges on the touch substrate. In a case that the floating touch operation occurs, sensing signals generated by sensing electrodes at floating touch positions corresponding to positions of the floating touch operation are changed, and positions and a type of the floating touch operation are thus determined based on the changed sensing signals and the second driving signals inputted to the touch electrodes corresponding to the sensing electrodes.

The mutual-capacitive type touch substrate of some embodiments of the present disclosure is shown in FIG. 5. The mutual-capacitive type touch substrate is manufactured in following steps: forming M×N sensing electrodes 4 on a transparent base substrate 1, wherein M and N are positive integers; forming an insulating layer 3 on the M×N sensing electrodes 4, wherein the insulating layer 3 completely covers the M×N sensing electrodes 4; subsequently, forming M touch electrodes 2 on the insulating layer 3; and then forming a transparent protective layer 5 on the M touch electrodes 2, wherein the transparent protective layer covers the M touch electrodes. After a manufacture process of the touch substrate is completed, the touch substrate may be bonded to the driving circuit 20 and a flexible circuit board 7 through a conductive adhesive 6. Optionally, the M×N sensing electrodes 4 may be arranged in a form of a matrix with M rows and N columns. Each of the M rows includes N sensing electrodes 4, and orthographic projections of the N sensing electrodes 4 on the touch substrate fall within orthographic projections of the M touch electrodes 2 on the touch substrate.

When the touch substrate is the self-capacitive type touch substrate, the touch electrodes serve as self-capacitive touch electrodes in the self-capacitive type touch substrate, and the touch substrate further includes a common electrode. In some embodiments, the touch electrodes and the common electrode are arranged in different layers, and an insulating layer is disposed between the touch electrodes and the common electrode.

Specifically, when the self-capacitive type touch substrate is used to implement a touch operation, the first driving signals are inputted to the respective touch electrodes included in the touch substrate sequentially in the first time duration within each touch period, so that the first electric fields are generated between the touch electrodes and the common electrode. If the contact touch operation occurs, an electric field between the common electrode and the touch electrode at a contact touch position corresponding to a position of the contact touch operation is changed, and the position at which the contact touch operation occurs is thus determined based on the changed electric field and the first driving signal inputted to the corresponding touch electrode. In the second time duration within each touch period, second driving signals are inputted to the respective touch electrodes, and the second driving signals are provided to have signal strengths larger than those of the first driving signals, so that second electric fields are generated between the touch electrodes and the common electrode. Thus, the second electric fields are superposed with the first electric fields generated in the first time duration, so as to form electric fields with larger field strengths and wider coverage ranges on the touch substrate. In a case that a floating touch operation occurs, the electric fields between the common electrode and the touch electrodes at floating touch positions corresponding to positions of the floating touch operation are changed, and the positions and the type of the floating touch operation are thus determined based on the changed electric fields and the second driving signals inputted to the corresponding touch electrodes.

Some embodiments of the present disclosure further provide a method for operating a touch device, the method is applied to the touch device provided by the above embodiments. Referring to FIG. 6, FIG. 6 is a flowchart of a method for operating a touch device in a case that the touch device includes a mutual-capacitive type touch substrate. When the touch substrate included in the touch device is the mutual-capacitive type touch substrate, the method includes steps S201 to S202.

Step S201: in a first time duration within a touch period, inputting first driving signals to the respective ones of the plurality of touch electrodes sequentially, and determining a position of a contact touch operation based on sensing signals generated on sensing electrodes in the mutual-capacitive type touch substrate, and based on the first driving signals inputted to the plurality of touch electrodes.

Step S202: in a second time duration within the touch period, inputting second driving signals to the respective ones of plurality of touch electrodes, and determining a position and a type of a floating touch operation based on sensing signals generated on the sensing electrodes, and based on the second driving signals inputted to the plurality of touch electrodes, wherein signal strengths of the second driving signals are larger than signal strengths of the first driving signals.

Specifically, when the touch substrate included in the touch device is a mutual-capacitive type touch substrate, in a first time duration within each touch period, the first driving sub-circuit in the driving circuit is configured to input first driving signals to the respective touch electrodes included in the touch substrate sequentially. The plurality of sensing electrodes included in the touch substrate receives sensed signals, so that first electric fields are generated between the touch electrodes and the sensing electrodes. If a contact touch operation occurs, a sensing signal generated by the sensing electrode at a contact touch position corresponding to a position of the contact touch operation is changed, and the position of the contact touch operation is thus determined based on the changed sensing signal and the first driving signal inputted to the touch electrode corresponding to the sensing electrode. In a second time duration within each touch period, the second driving sub-circuit is configured to input second driving signals to the respective touch electrodes, wherein the second driving signals have signal strengths larger than those of the first driving signals, so that second electric fields are generated between the touch electrodes and the sensing electrodes. Thus, the second electric fields are superposed with the first electric fields generated between the touch electrodes and the sensing electrodes in the first time duration, so as to form electric fields with higher field strengths and wider coverage range on the touch substrate. In a case that a floating touch operation occurs, the sensing signals generated by the sensing electrodes at floating touch positions corresponding to positions of the floating touch operation are changed, and the positions and the type of the floating touch operation are thus determined based on the changed sensing signals and the second driving signals inputted to the touch electrodes corresponding the sensing electrodes.

Further, the determining the type of the floating touch operation includes determining the type of the floating touch operation according to time points at which the sensing signals generated on the sensing electrodes are changed.

Specifically, when the floating touch operation is performed above the touch device, the sensing signals generated by the sensing electrodes at the floating touch positions corresponding to the positions of the floating touch operation are changed. Therefore, a positional path formed by positions at which floating touch operations occur may be determined according to an order of time points at which the sensing signals on the sensing electrodes are changed, so as to determine the type of the floating touch operation.

Figure 4:
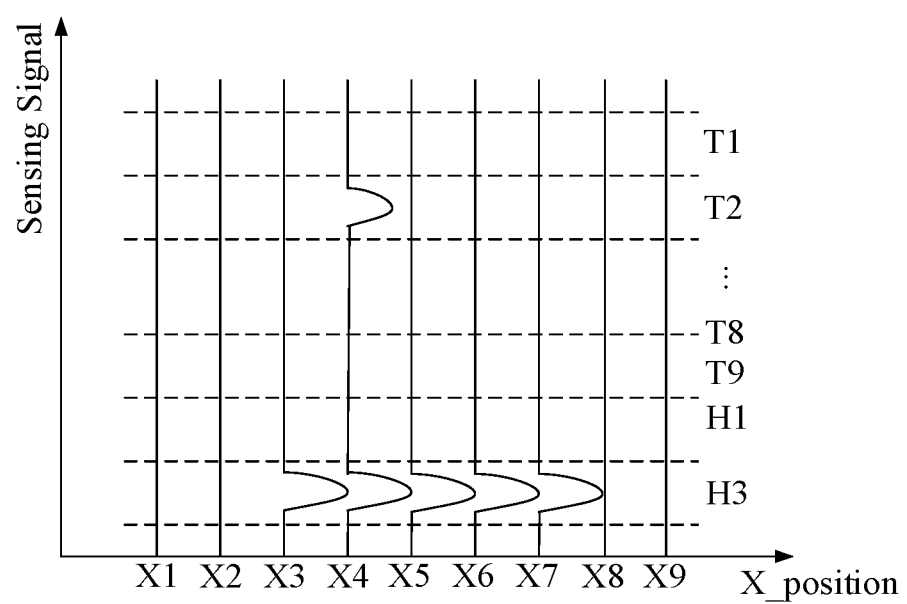
FIG. 4 is a schematic diagram showing changes in sensing signals in a contact touch operation and a floating touch operation provided in some embodiments of the present disclosure.

In more detail, there are many types of floating touch operations, such as sliding from right to left, sliding from left to right, sliding from top to bottom, sliding from bottom to top, double-clicking, etc. Taking the floating touch operation including the sliding from left to right as an example, when the floating touch operation occurs, the sensing signals generated by the sensing electrodes at the floating touch positions are sequentially changed from left to right (as shown in FIG. 4, sequentially changed from X3 to X7). The type of the floating touch operation may be thus determined to be sliding from left to right according to time points at which the sensing signals generated on the sensing electrodes are changed.

Figure 7:
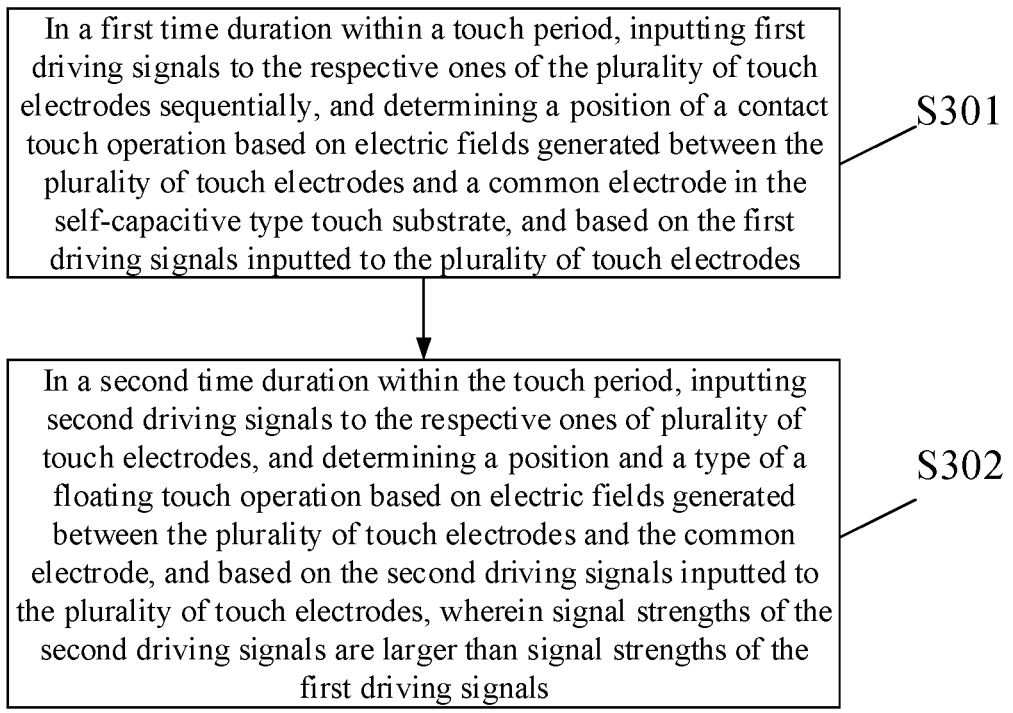
FIG. 7 is a second flowchart of a method for operating a touch device provided in some embodiments of the present disclosure.

Some embodiments of the present disclosure further provide a method for operating a touch device. The method for operating a touch device is applied to the touch device provided by the above embodiments. Referring to FIG. 7, FIG. 7 is a flowchart of a method for operating a touch device when the touch device includes a self-capacitive type touch substrate. When the touch substrate included in the touch device is the self-capacitive touch substrate, the operating method includes steps S301-S302.

Step S301: in a first time duration within a touch period, inputting first driving signals to the respective ones of the plurality of touch electrodes sequentially, and determining a position of a contact touch operation based on electric fields generated between the plurality of touch electrodes and a common electrode in the self-capacitive type touch substrate, and based on the first driving signals inputted to the plurality of touch electrodes.

Step S302: in a second time duration within the touch period, inputting second driving signals to the respective ones of plurality of touch electrodes, and determining a position and a type of a floating touch operation based on electric fields generated between the plurality of touch electrodes and the common electrode, and based on the second driving signals inputted to the plurality of touch electrodes, wherein signal strengths of the second driving signals are larger than signal strengths of the first driving signals.

Specifically, when the touch substrate included in the touch device is the self-capacitive touch substrate, in a first time duration within each touch period, the first driving sub-circuit in the driving circuit is configured to input first driving signals to the respective touch electrodes included in the touch substrate sequentially, so that first electric fields are generated between the touch electrodes and the common electrode. If a contact touch operation occurs, the electric field between the common electrode and the touch electrode at a contact touch position corresponding to a position of the contact touch operation is changed, and the position of the contact touch operation is thus determined based on the changed electric field and the first driving signal inputted to the corresponding touch electrode. In the second time duration within each touch period, the second driving sub-circuit in the driving circuit is configured to input second driving signals to the respective touch electrodes, wherein the second driving signals having signal strengths larger than those of the first driving signals, so that second electric fields are generated between the touch electrodes and the common electrode. Thus, the second electric fields are superposed with the first electric fields generated in the first time duration, so as to form electric fields with higher field strengths and wider coverage ranges on the touch substrate. In a case that a floating touch operation occurs, the electric fields between the common electrode and the touch electrodes at floating touch positions corresponding to positions of the floating touch operation are changed, and the positions and the type of the floating touch operation are thus determined based on the changed electric fields and the second driving signals inputted to the corresponding touch electrodes.

Further, the determining the type of the floating touch operation includes determining the type of the floating touch operation according to an order of time points at which the electric fields generated between the touch electrodes and the common electrode are changed.

Specifically, when the floating touch operation is performed above the touch device, the electric fields generated between the touch electrodes and the common electrode at positions corresponding to positions of the floating touch operation occurs are changed. Therefore, a positional path formed by the positions of the floating touch operations may be determined according to an order of time points at which the electrical fields generated between the touch electrodes and the common electrode are changed, so as to determine the type of the floating touch operation.

In order to illustrate the operating process of the touch device provided in some embodiments of the present disclosure more clearly, a specific example is given below.

Figure 3:
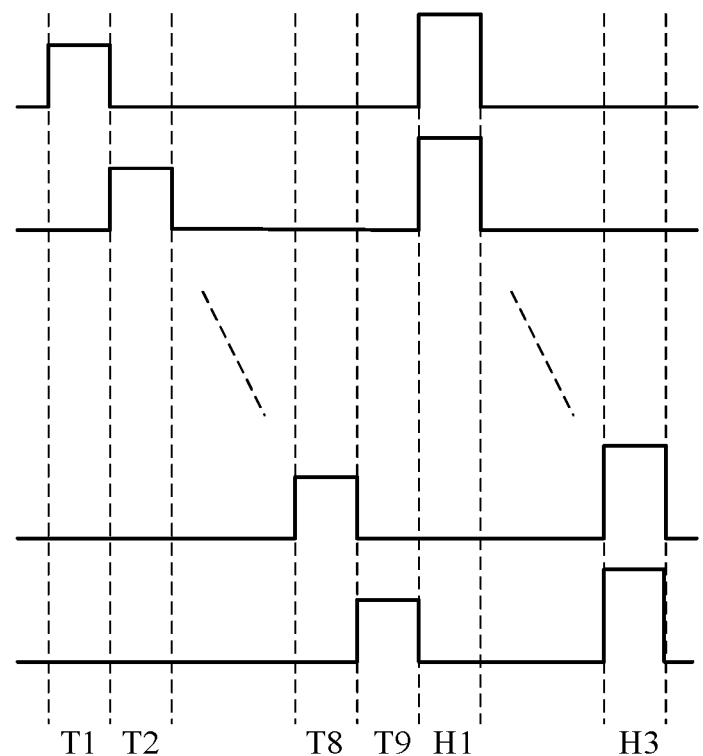
FIG. 3 is a schematic diagram showing driving signals inputted to touch electrodes provided in some embodiments of the present disclosure.

Referring to FIG. 2 to FIG. 4, the touch device includes a mutual-capacitive type touch substrate. The mutual-capacitive type touch substrate includes nine touch electrodes Y1 to Y9 arranged in a first direction, and eighty-one sensing electrodes. The eighty-one sensing electrodes are arranged in a form of a matrix having nine rows and nine columns. Moreover, the nine columns of the sensing electrodes are arranged as X1 to X9 in a second direction, and the nine sensing electrodes in each column of sensing electrodes are connected sequentially through electrical connections. In a first time duration within one touch period, first driving signals T1 to T9 are sequentially inputted to the touch electrodes Y1 to Y9, respectively. In a second time duration within the touch period, the touch electrodes Y1 to Y9 are divided into three groups, a first group of the three groups includes the touch electrodes Y1 to Y3, a second group of the three groups includes the touch electrodes Y4 to Y6, and a third group of the three groups includes the touch electrodes Y7 to Y9, and second driving signals H1 to H3 having signal strengths larger than those of the first driving signals are inputted to the three groups of the touch electrodes respectively and sequentially.

As shown in FIG. 2, when a contact touch operation occurs at a position A, a change in the sensing signal generated by the sensing electrode X4 may be detected, and a position at which the contact touch operation occurs may thus be determined based on the sensing electrode X4 and a timing of the first driving signal T2. When a floating touch operation including sliding from left to right occurs at a position B, changes in the sensing signals generated by the sensing electrodes X3 to X7 may be detected, and thus the positions and the type of the floating touch operation may be determined based on the sensing electrodes X3 to X7 and a timing of the second driving signal H3.

In the technical solutions of the present disclosure, by inputting the first driving signals to the respective touch electrodes in the touch substrate in the first time duration within each touch period sequentially and inputting the second driving signals having signal strengths larger than those of the first driving signals to the respective touch electrodes in the touch substrate in the second time duration within the touch period sequentially, the contact touch operation on the touch substrate may be implemented in the first time duration, and the floating touch operation above the touch substrate may be implemented in the second time duration. Thus, when the technical solution of the present disclosure is used to drive the touch substrate, there is no need to add an additional system in the touch substrate for a purpose of implementing the floating touch operation, and the floating touch operation may be realized in the present disclosure simply by further applying, to the touch substrate capable of implementing the contact touch operation in the related art, driving signals to increase field strengths of the electric fields generated on the touch substrate. Hence, when the technical solutions of the present disclosure are used to drive the touch substrate, the contact touch technique and the floating touch technique may be combined without increasing a production cost of the touch substrate, and the problem in the related art that the touch-type electronic products based on the floating touch technique have complicated structures and high production costs may be effectively addressed.

Unless otherwise defined, technical terms or scientific terms used herein should have general meanings as commonly understood by those having ordinary skills in the art to which the present disclosure pertains. Terms such as "first" and "second" used herein are used to distinguish different constituent components rather than to indicate any sequence, number or importance. The terms "comprising", "including" or other variants thereof are intended to mean that the element or item stated before such terms encompasses elements, items and equivalents thereof listed after these terms without excluding other elements or items not expressly listed. The terms "connect", "connected" or the like are not intended to define physical or mechanical connections, but may include an electrical connection, either a direct or an indirect electrical connection. Such words as "up", "down", "left" and "right" are merely used to represent a relative positional relationship, and when an absolute position of the described object is changed, the relative position relationship may also be changed accordingly.

It may be understood that when an element such as a layer, a film, a region or a substrate is referred to as being "on" or "under" another element, the layer, the film, the region or the substrate may be directly "on" or "under" the another element, or an intervening element may be present.

In the description of the above embodiments, specific features, structures, materials or characteristics may be combined in any suitable manner in one or more embodiments or examples.

The above are merely specific embodiments of the present disclosure, and the protection scope of the present disclosure is not limited thereto. Changes or substitutions that any person skilled in the art may easily think of based on the technical scope of the present disclosure fall within the protection scope of the present disclosure. Therefore, the protection scope of the present disclosure should be determined according to the claims.

What is claimed is:

1. A method for driving a touch substrate, the touch substrate comprising a plurality of touch electrodes, the method comprising:
inputting first driving signals to respective ones of the plurality of touch electrodes sequentially in a first time duration within a touch period; and
inputting second driving signals to the respective ones of the plurality of touch electrodes in a second time duration within the touch period, wherein signal strengths of the second driving signals are larger than signal strengths of the first driving signals, wherein prior to the inputting the second driving signals to the respective ones of the plurality of touch electrodes, the method further comprises dividing the plurality of touch electrodes into multiple groups of touch electrodes, wherein each group of the multiple groups of touch electrodes comprises at least one touch electrode of the plurality of touch electrodes; and the inputting the second driving signals to the respective ones of the plurality of touch electrodes comprises inputting the second driving signals to the multiple groups of touch electrodes sequentially, wherein the second driving signal inputted to a corresponding group of touch electrodes is inputted to the at least one touch electrode included in the corresponding group of touch electrodes simultaneously.

2. The method according to claim 1, wherein the signal strengths of the second driving signals are twice or more than twice of the signal strengths of the first driving signals.

3. The driving method according to claim 1, wherein the at least one touch electrode comprises at least three neighboring touch electrodes.

4. A circuit for driving a touch substrate, the touch substrate comprising a plurality of touch electrodes, the circuit for driving the touch substrate being electrically connected to the plurality of touch electrodes and comprising:

a first driving sub-circuit, configured to input first driving signals to the respective ones of the plurality of touch electrodes sequentially in a first time duration within a touch period; and a second driving sub-circuit, configured to input second driving signals to the respective ones of the plurality of touch electrodes in a second time duration within the touch period, wherein signal strengths of the second driving signals are larger than signal strengths of the first driving signals, the plurality of touch electrodes comprises multiple groups of touch electrodes, each group of the multiple groups of touch electrodes comprises at least one touch electrode of the plurality of touch electrodes, and the second driving sub-circuit is further configured to input the second driving signals to the multiple groups of touch electrodes sequentially, wherein the second driving signal inputted to a corresponding group of touch electrodes is inputted to the at least one touch electrode included in the corresponding group of touch electrodes simultaneously.

5. The circuit according to claim 4, wherein the signal strengths of the second driving signals are twice or more than twice of the signal strengths of the first driving signals.

6. A touch device, comprising:

a touch substrate, comprising a plurality of touch electrodes; and the circuit according to claim 4, electrically connected to the plurality of touch electrodes.

7. The touch device according to claim 6, wherein in a case that the plurality of touch electrodes comprise multiple groups of touch electrodes, each group of the multiple groups of touch electrodes comprises at least three neighboring touch electrodes.

8. The touch device according to claim 6, wherein the touch substrate is a mutual-capacitive type touch substrate, and the plurality of touch electrodes are used as driving electrodes in the mutual-capacitive type touch substrate; or the touch substrate is a self-capacitive type touch substrate, and the plurality of touch electrodes are used as self-capacitive touch electrodes in the self-capacitive type touch substrate.

9. The touch device according to claim 8, wherein the touch substrate is the mutual-capacitive type touch substrate, the plurality of touch electrodes are M touch electrodes, and the touch substrate further comprises:

M×N sensing electrodes, wherein M and N are positive integers; and an insulating layer located between the M touch electrodes and the M×N sensing electrodes.

10. The touch device according to claim 9, wherein the M×N sensing electrodes are arranged in a form of a matrix having M rows and N columns; each row of the M rows comprises N sensing electrodes, and orthographic projections of the N sensing electrodes on the touch substrate are within orthogonal projections of the M touch electrodes on the touch substrate.

11. The touch device according to claim 8, wherein the touch substrate is the self-capacitive type touch substrate, the touch substrate further comprises a common electrode and an insulating layer located between the plurality of touch electrodes and the common electrode.

12. A method for operating a touch device, the method being applied to the touch device according to claim 8, and in a case that the touch substrate comprised in the touch device is a mutual-capacitive type touch substrate, the method comprising:

in a first time duration within a touch period, inputting first driving signals to the respective ones of the plurality of touch electrodes sequentially, and determining a position of a contact touch operation based on sensing signals generated on sensing electrodes in the mutual-capacitive type touch substrate, and based on the first driving signals inputted to the plurality of touch electrodes; and in a second time duration within the touch period, inputting second driving signals to the respective ones of plurality of touch electrodes, and determining a position and a type of a floating touch operation based on sensing signals generated on the sensing electrodes, and based on the second driving signals inputted to the plurality of touch electrodes, wherein signal strengths of the second driving signals are larger than signal strengths of the first driving signals.

13. The method according to claim 12, wherein the determining the type of the floating touch operation comprises:

determining the type of the floating touch operation based on an order of time points at which sensing signals generated on the sensing electrodes are changed.

14. A method for operating a touch device, the method being applied to the touch device according to claim 8, and in a case that the touch substrate in the touch device is the self-capacitive type touch substrate, the method comprising:

in a first time duration within a touch period, inputting first driving signals to the respective ones of the plurality of touch electrodes sequentially, and determining a position of a contact touch operation based on electric fields generated between the plurality of touch electrodes and a common electrode in the self-capacitive type touch substrate, and based on the first driving signals inputted to the plurality of touch electrodes; and in a second time duration within the touch period, inputting second driving signals to the respective ones of plurality of touch electrodes, and determining a position and a type of a floating touch operation based on electric fields generated between the plurality of touch electrodes and the common electrode, and based on the second driving signals inputted to the plurality of touch electrodes, wherein signal strengths of the second driving signals are larger than signal strengths of the first driving signals.

15. The method according to claim 14, wherein the determining the type of the floating touch operation comprises:

determining the type of the floating touch operation based on an order of time points at which the electric fields generated between the plurality of touch electrodes and the common electrode are changed.

* * * * *